United States Patent
Papenheim et al.

(10) Patent No.: US 11,576,544 B2
(45) Date of Patent: Feb. 14, 2023

(54) METHOD FOR OPERATING A CLEANING SYSTEM

(71) Applicant: Vorwerk & Co. Interholding GmbH, Wuppertal (DE)

(72) Inventors: Marc Papenheim, Wuppertal (DE); Andrej Mosebach, Unna (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 221 days.

(21) Appl. No.: 17/166,206

(22) Filed: Feb. 3, 2021

(65) Prior Publication Data

US 2021/0235954 A1 Aug. 5, 2021

(30) Foreign Application Priority Data

Feb. 4, 2020 (DE) ..................... 10 2020 102 766.4

(51) Int. Cl.
*G05D 1/02* (2020.01)
*A47L 9/28* (2006.01)

(52) U.S. Cl.
CPC ............. *A47L 9/2852* (2013.01); *A47L 9/281* (2013.01); *A47L 9/2826* (2013.01);
(Continued)

(58) Field of Classification Search
CPC .... A47L 9/2826; A47L 9/2852; A47L 9/2857; A47L 9/281; A47L 9/2805;
(Continued)

(56) References Cited

U.S. PATENT DOCUMENTS 6,459,955 B1 * 10/2002 Bartsch ............... A47L 11/4061
318/587
7,574,282 B2 * 8/2009 Petersson ............... B60L 3/12
701/25
(Continued)

FOREIGN PATENT DOCUMENTS

DE  10 2016 108 513 A1  11/2017
DE  10 2017 113 288 A1  12/2018

OTHER PUBLICATIONS

Behrends, Simulation-based debugging of active databases, 1994, IEEE, p. 172-180 (Year: 1994).*
(Continued)

*Primary Examiner* — McDieunel Marc
(74) *Attorney, Agent, or Firm* — Collard & Roe, P.C.

(57) ABSTRACT

A method for operating a cleaning system that comprises at least one self-traveling cleaning device that travels in an environment based on an environment map and carries out cleaning activities. The cleaning device accesses a database, in which multiple cleaning activities are stored. A user accesses the database and defines in advance at least one randomly occurring event, depending on the occurrence of which at least one certain cleaning activity is carried out. The user defines an event-dependent activity scenario and the activity scenario is carried out upon the subsequent occurrence of the defined event. At least one cleaning activity is also scheduled time-dependently, and predefined rules determine whether only the event-dependent activity scenario or only the time-dependently scheduled cleaning activity is carried out if the time of an occurrence of a defined event falls short of a predefined minimum time interval.

9 Claims, 3 Drawing Sheets

(52) U.S. Cl.
CPC ........ *G05D 1/0219* (2013.01); *A47L 2201/06* (2013.01); *G05D 2201/0203* (2013.01)

(58) Field of Classification Search
CPC .............. A47L 2201/06; G05D 1/0219; G05D 2201/0203; G06Q 50/163; G06Q 10/06316
See application file for complete search history.

(56) References Cited

U.S. PATENT DOCUMENTS

| | | | | |
|---|---|---|---|---|
| 7,953,526 | B2 * | 5/2011 | Durkos | G05D 1/0278 701/25 |
| 9,985,847 | B2 * | 5/2018 | Tung | H04L 41/5009 |
| 10,842,333 | B2 | 11/2020 | Koetz | |
| 11,274,929 | B1 * | 3/2022 | Afrouzi | G06T 7/62 |
| 11,348,269 | B1 * | 5/2022 | Ebrahimi Afrouzi | G06T 7/344 |
| 2011/0004342 | A1 * | 1/2011 | Knopow | A47L 5/28 701/25 |
| 2018/0361569 | A1 | 12/2018 | Hackert et al. | |

OTHER PUBLICATIONS

Diego et al., Please do not disturb! Minimum interference coverage for social robots, 2013, IEEE, p. 1968-1973 (Year: 2013).*
Cottone et al., User activity recognition for energy saving in smart homes, 2013, IEEE, p. 1-9 (Year: 2013).*
Renoux et al., Simulating Daily Activities in a Smart Home for Data Generation, 2019, IEEE, p. 798-809 (Year: 2019).*

* cited by examiner

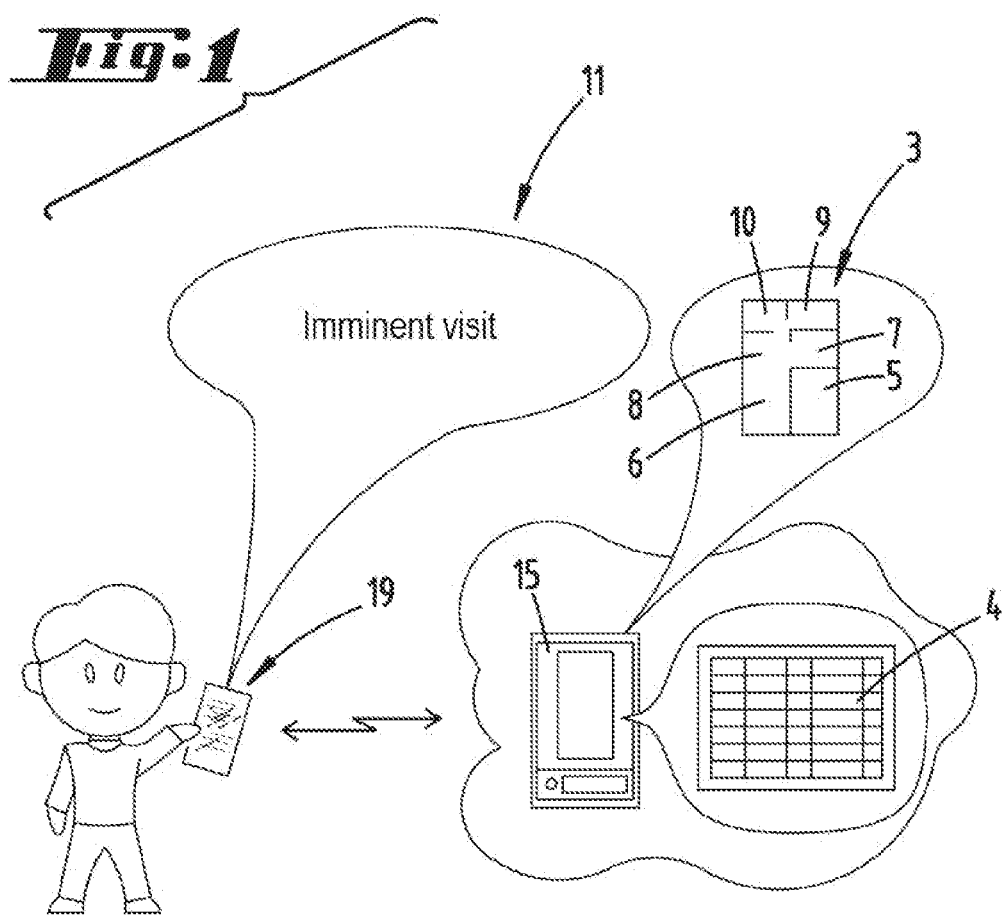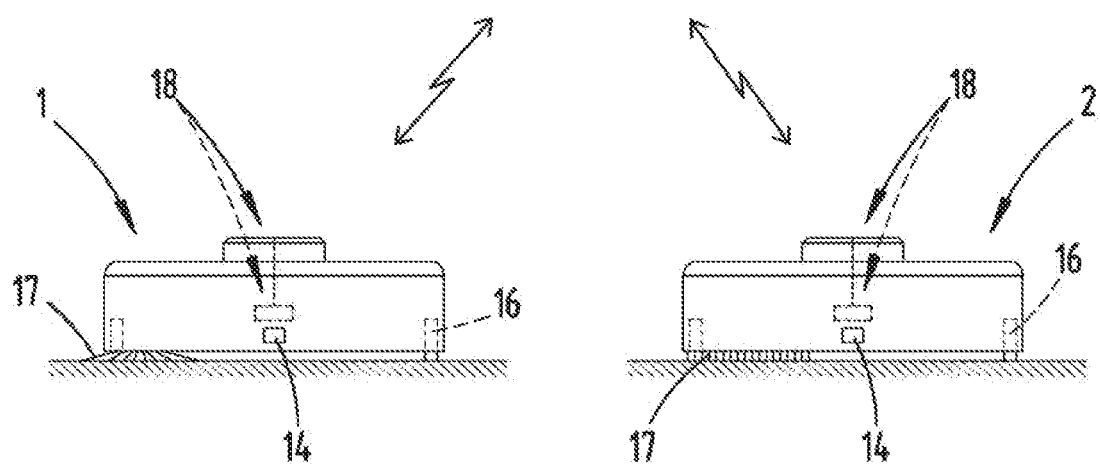

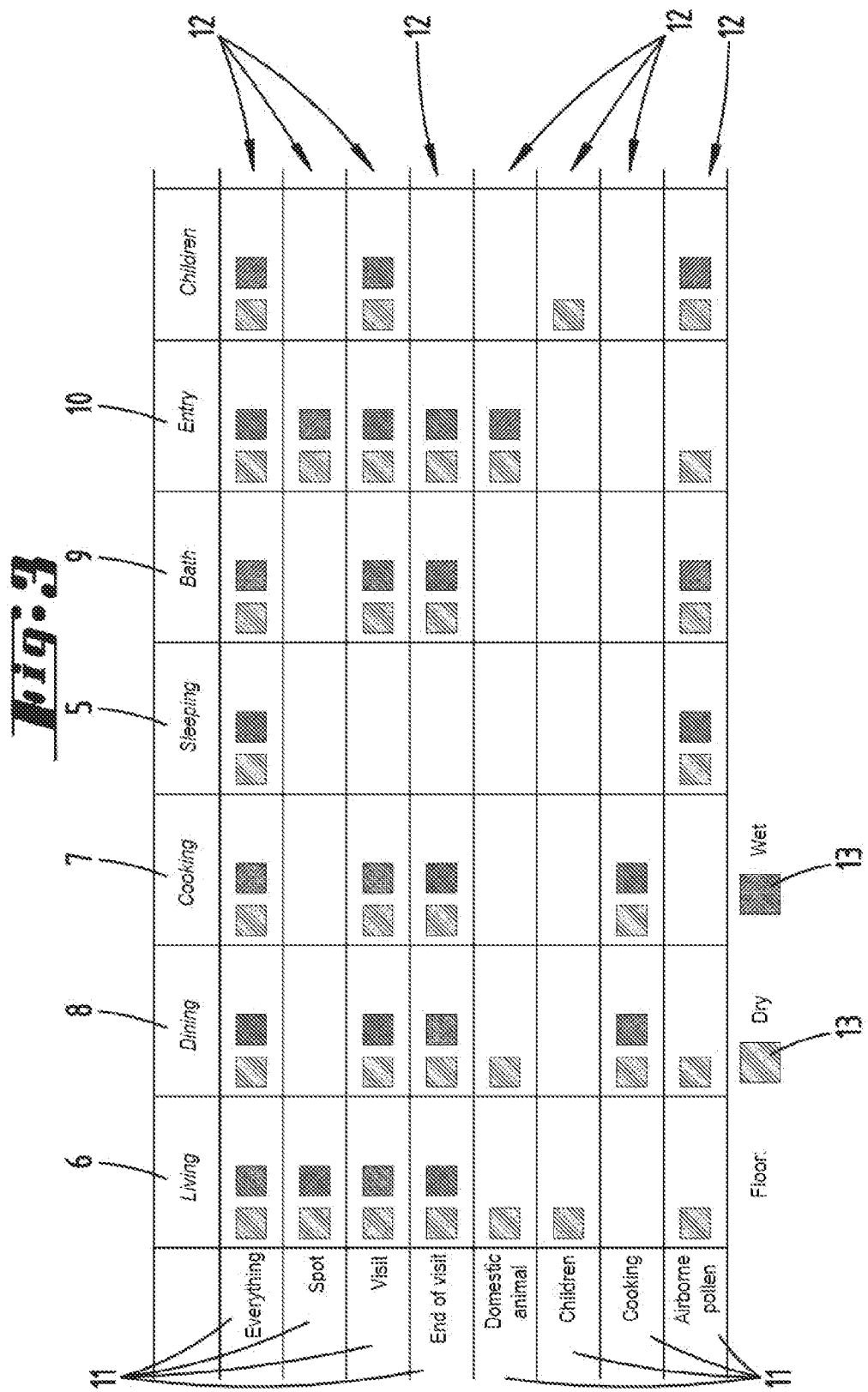

METHOD FOR OPERATING A CLEANING SYSTEM

CROSS REFERENCE TO RELATED APPLICATIONS

Applicant claims priority under 35 U.S.C. § 119 of German Application No. 10 2020 102 766.4 filed Feb. 4, 2020, the disclosure of which is incorporated by reference.

BACKGROUND OF THE INVENTION

1. Field of the Invention

The invention pertains to a method for operating a cleaning system that comprises at least one self-traveling cleaning device, wherein the cleaning device travels in an environment based on an environment map and carries out cleaning activities in said environment, wherein the cleaning device accesses a database, in which multiple cleaning activities to be carried out in at least one environment section of the environment are stored, wherein a user accesses the database and defines in advance at least one randomly occurring event, which changes a cleaning status of at least one environment section and in dependence on the occurrence of which at least one certain cleaning activity should be carried out in at least one certain environment section. The user defines an event-dependent activity scenario for the defined event in advance, namely before the occurrence of the event, and the activity scenario contains a defined allocation of a certain cleaning activity to be carried out to a certain environment section, in which the cleaning activity should be carried out. The activity scenario is carried out by at least one cleaning device upon the subsequent occurrence of the defined event.

2. Description of the Related Art

Cleaning systems with one or more self-traveling cleaning devices are known from the prior art. The cleaning devices may consist, for example, of vacuuming robots, wiping robots, polishing robots or the like. The cleaning devices comprise cleaning elements such as brushes, wiping elements, polishing elements or the like. It is furthermore known to control such cleaning devices automatically in order to carry out cleaning activities, during which the cleaning device cleans a surface.

It is furthermore known to operate multiple self-traveling cleaning devices within a system, wherein a common database is available, and wherein cleaning activities for one or more cleaning devices are stored in said database.

DE 10 2017 113 288 A1 (also published as US 2018/0361569 A1) discloses a system with multiple cleaning devices for treating a surface in an automatically controlled manner, wherein a common database is assigned to the cleaning devices and contains cleaning activities for the cleaning devices, which are scheduled in accordance with defined rules. The cleaning activities are scheduled automatically by a central computing device of the system, for example, in dependence on a dirt accumulation of a section of a surface, which is detected by a cleaning device.

DE 10 2016 108 513 A1 discloses a cleaning system, in which a user defines in advance events that trigger at least one cleaning activity.

SUMMARY OF THE INVENTION

Based on the above-described prior art, the invention aims to advantageously enhance such a system with at least one self-traveling cleaning device.

In order to attain the above-defined objective, it is proposed that at least one cleaning activity is also scheduled time-dependently in addition to the defined event-dependent activity scenario, wherein it is decided in accordance with predefined rules whether only the event-dependent activity scenario or only the time-dependently scheduled cleaning activity is carried out in case the time of an occurrence of a defined event falls short of a predefined minimum time interval from a defined time for carrying out the time-dependently scheduled cleaning activity for the same environment section.

One or more additional parameters can also be taken into account in the decision on which cleaning activity is carried out in the respective environment section, wherein said parameter or parameters is/are selected from the following group: a time and/or type of a cleaning activity carried out most recently in the respective environment section, a number of the persons and/or animals present in the environment, a usual dirt quantity occurring in the environment section and cleaning of the environment section by means of a manually operated cleaning device. The environment sections of the environment therefore may be subject to time-dependent scheduling, e.g., a calendar schedule, as well as event-dependent scheduling of cleaning activities, wherein it is checked which cleaning activity should be carried out in case of a time conflict between a time for carrying out a time-dependently scheduled cleaning activity and a time for carrying out an event-dependently scheduled cleaning activity.

The user defines in advance an activity scenario, which contains at least one certain cleaning activity to be carried out in case of the random, unscheduled occurrence of a predefined event in a certain environment section. The activity scenario particularly may define a plurality of cleaning activities to be carried out in a chronologically and/or organizationally coherent manner upon the occurrence of the defined event. The user can combine multiple cleaning activities in the activity scenario, wherein said cleaning activities can be triggered with a single control command, namely upon the occurrence of the defined event linked to this activity scenario. The event-dependent activity scenarios therefore can be quickly addressed on demand, namely upon the occurrence of the event, without requiring the user to instantaneously determine the required cleaning activities and how to compile them in order to carry out a suitable batch of cleaning activities. Spontaneous scheduling of cleaning activities by either the user or the control unit of the system is therefore unnecessary upon the occurrence of the event. Consequently, the method is particularly time-optimized and saves resources. The event-dependent activity scenario contains a clear and fixed allocation of one or more cleaning activities to be carried out to a certain environment section such that only the defined cleaning activity or the defined cleaning activities is/are carried out in the defined environment section or multiple defined environment sections when the defined activity scenario is invoked. In this way, the user can define a plurality of activity scenarios that are stored in the database of the cleaning system and retrieved from the database upon the occurrence of a defined event. The events are likewise defined in advance. In this context, it would be possible to define a so-called "mother-in-law scenario," in which the environment sections of a residence, which are usually entered by the mother-in-law (or generally a visitor), are vacuumed. The user preferably divides an environment, for example a residence, into environment sections in order to define the activity scenarios and to allocate cleaning activities to environment sections. For example, the environment sections may be rooms of a residence, particularly a living room, kitchen, dining room, guest toilet, hallway, bathroom, bedroom, nursery, study and the like. Cleaning activities, which can be carried out by the cleaning device or the cleaning devices of the cleaning system, are furthermore defined. Exemplary cleaning activities include vacuuming, dry wiping, wet wiping, polishing, buffing or the like. Activity scenarios, which the user can subsequently address with a scenario name once the event has actually occurred, are formed in that the user now defines which cleaning activities are to be carried out in which environment sections in which randomly occurring future event. For example, such a scenario name may be visit, return from vacation, domestic animal, cooking, end of visit, airborne pollen, foul weather or the like. When the event subsequently occurs, e.g. when a visit is imminent, the user of the cleaning system can instruct the control unit to start the activity scenario "visit." For example, the user may utilize a mobile terminal, particularly a mobile telephone, a tablet computer or the like, in order to select the desired activity scenario "visit" from a plurality of predefined activity scenarios and to start the desired activity scenario. The environment sections predefined for this activity scenario are then treated, for example vacuumed and/or wiped, by one or more cleaning devices in accordance with the likewise predefined sequence. In this way, a plurality of individual activity scenarios can be defined and stored in the database of the cleaning system. Upon the occurrence of an event defined by the user, a corresponding activity scenario, which comprises the cleaning activities predefined for the event by the user, can be started. The user may furthermore be machine-assisted in defining the activity scenarios by means of a computing device of the cleaning system. For example, a floor plan of the environment may initially be divided into sensible environment sections in a machine-assisted manner. To this end, the floor plan may initially be analyzed, for example, to the effect that areas bounded by walls and door passages are identified as rooms of a residence. The user can establish allocations in the database to the effect which environment section requires which cleaning activity, e.g., based on a floor type or the like in the respective environment section, and specify that certain environment sections should only for certain events be treated by means of deep pore cleaning, quick cleaning, spot cleaning, moist, wet or dry cleaning, while the air cleaner is activated, while the window is opened or the like.

Environment sections in accordance with the invention may not only be individual rooms, but also room areas that preferably have uniform properties and therefore require a certain cleaning activity and optionally also a certain cleaning intensity. The environment sections preferably can be explored by one or more cleaning devices of the cleaning system, preferably in the course of an exploratory run, during which existing properties are recorded. The user can subsequently retrieve, for example, a floor plan of the environment with the environment sections on a mobile terminal or on a local computer and assign designations to the individual environment sections. A predefined activity scenario in accordance with the invention, which should be carried out upon the occurrence of an event, concerns one or more of the defined environment sections that should be coherently cleaned in accordance with certain cleaning specifications. The allocation of the environment sections to the activity scenarios may then be recorded, for example, in a matrix stored in the database. A type of cleaning, e.g., wet or dry cleaning, may be predefined for each of the environment sections in this case. The matrix may be established in the form of a table, in which the table columns contain, for example, the environment sections and the table rows contain the defined events. The table element defined for a certain event and a certain environment section can preferably contain information on the type of cleaning, for example, vacuuming, wiping, dry cleaning, wet cleaning, intensive cleaning, gentle cleaning, eco-cleaning or the like.

The activity scenario may furthermore contain information on a cleaning device, by means of which the cleaning activity should be carried out. Accordingly, cleaning devices to be used for certain cleaning activities also are already predefined in the activity scenario. For example, the information on the cleaning device may be stored in the aforementioned table such that it is already specified which environment section should be cleaned by which cleaning device upon the occurrence of which environmental event, as well as which type of cleaning activity should be carried out by this cleaning device, prior to the occurrence of the event. In this case, the cleaning activity itself can already define the type of cleaning device. If a cleaning activity in the form of a wiping process should be carried out, a wiping device, which can actually carry out this cleaning activity, is scheduled for use in the corresponding activity scenario. The allocation of the cleaning devices to be used in the course of a certain activity scenario may be realized manually by a user or automatically by a computing device of the cleaning system, which has information on the available cleaning devices and selects the cleaning device that is optimally suited for treating a certain environment section and for carrying out a certain cleaning activity.

The user may inform the cleaning system of the occurrence of a defined event manually or the occurrence of the defined event may be detected by means of a detection device in order to inform the system automatically. In both instances, a control unit of the system retrieves a defined activity scenario for the event, of which it has been informed, from the database and controls the implementation of the at least one cleaning activity contained in this activity scenario. The activity scenarios therefore can either be activated automatically by the control unit of the cleaning system or manually by the input of a user in order to carry out a predefined cleaning activity in a predefined environment section or to carry out a sequence of multiple cleaning activities in certain environment sections. The user preferably has a terminal that is linked to the cleaning system via a wireless communication system, wherein an application is installed on said terminal and enables the user to define events and to establish activity scenarios, as well as to inform the system that a certain event has occurred, e.g. an imminent visit, a certain weather forecast that causes an increased dirt accumulation in one or more environment sections or the like. The control unit of the system accesses the database and, for example, the table stored therein and retrieves a stored activity scenario for the event, of which it has been informed. The control unit subsequently controls the cleaning activities in the corresponding environment sections defined in the activity scenario, wherein predefined cleaning devices, which should carry out the cleaning activities, may already be stored beforehand or the control unit spontaneously determines which cleaning device is currently available and suitable for carrying out the cleaning activity. The control unit can access additional information sources during the control of the implementation of the cleaning activities, particularly an environment map that was generated by a cleaning device and/or is stored in a database of the cleaning system. Furthermore, the control unit preferably accesses information on the time of a most recent cleaning activity in a certain environment section, the type of a most recent cleaning activity in a certain environment section, an average dirt quantity to be usually expected in a certain environment section, information on a number of persons and/or domestic animals in a household, information on whether a user of the cleaning system also carries out cleaning activities by means of manual cleaning devices in addition to the self-traveling cleaning devices and information on whether manual and/or autonomous cleaning devices are currently operated in one or more environment sections, wherein said information is also stored, for example, in the database. Based on this additional information, the control unit can subsequently determine which cleaning device is best suited for carrying out a certain cleaning activity in a certain environment section and/or which cleaning parameters of the cleaning activity, e. g. intensive cleaning or gentle cleaning, should be applied.

It is furthermore proposed that multiple event-dependent activity scenarios are weighted relative to one another with a defined ranking, wherein the activity scenario with the highest rank is carried out first in case multiple defined events occur simultaneously. The highest rank particularly may be assigned to an activity scenario that is defined for an event involving a person and/or an animal. According to this embodiment, the activity scenarios defined by the user have a priority that indicates whether a certain activity scenario should be carried out with priority over one or more other activity scenarios. In certain situations, multiple events may occur at once, wherein it would be possible, for example, that a visit is imminent on the one hand and a weather situation, which likewise requires one or more certain cleaning activities, arises on the other hand. In such a situation, a ranking of the defined activity scenarios, which is stored in the database, determines which of the activity scenarios defined for the events should be carried out initially or exclusively, i.e. whether the visit scenario or the foul weather scenario should be carried out in the aforementioned example. It is basically also possible that no selection between two or more activity scenarios has to be made, but two activity scenarios rather are combined with one another such that all environment sections, which are subject to at least one of the two activity scenarios, are altogether cleaned. In this respect, a simultaneous implementation of multiple activity scenarios can be achieved such that all environment sections allocated to the two defined events are cleaned as an overall result. Furthermore, both activity scenarios may be carried out successively, wherein it is specified which activity scenario has a higher rank and therefore is carried out prior to the other activity scenario. The rule stating that activity scenarios, which should be carried out for an event involving a person and/or an animal, have a higher priority particularly applies to the specification of the ranking of the activity scenarios. Examples of such events are a visit, the conclusion of a visit, cooking and baking, dog leaving the residence in order to be taken for a walk or the like. In contrast, all other activity scenarios, the implementation of which is dependent on an event that does not involve a person and/or an animal, may be assigned a lower priority.

Multiple environment sections, which should be cleaned in the course of the same event-dependent activity scenario, furthermore may be weighted relative to one another with a defined ranking, wherein the environment section with the highest rank is cleaned first, and wherein the highest rank is assigned to the environment section, which in addition to the event-dependent activity scenario is also the location for carrying out a time-dependently scheduled cleaning activity. The highest rank particularly may be assigned to an environment section that is scheduled for a time-dependent cleaning activity at an earlier time. According to this embodiment, the environment sections involved in a common activity scenario are stored with a ranking such that the environment sections, which have a higher rank than other environment sections, are cleaned first during the implementation of the activity scenario. In this case, the assignment of the ranks to the environment sections takes place in accordance with the rule stating that an environment section, which is not only scheduled for an event-dependent activity scenario, but in which a cleaning activity should also be carried out at a certain time, is assigned a higher or the highest rank relative to the other environment sections. In this case, the environment section is incorporated, for example, into a chronologically recurring cleaning pattern and represents the location for carrying out a time-dependently scheduled cleaning activity at certain times, e.g. regularly every Saturday, regularly every day at 10 a.m. or the like. The time-dependently scheduled cleaning activity may be stored, for example, in a calendar that contains an appointed time for one or more cleaning devices and one or more environment sections. If a certain environment section is also the location for carrying out time-dependently scheduled cleaning activities, this environment section should be cleaned first. If multiple environment sections in the activity scenario are subject to such double scheduling, i.e., if they represent a location for carrying out a time-dependently scheduled cleaning activity as well as a location for carrying out an event-dependent cleaning activity, the environment section being cleaned first is the environment section, the time-dependently scheduled cleaning activity of which is due next. This ensures that no time and/or location conflict occurs in the environment section in question. Furthermore, the time-dependently scheduled cleaning activity or the event-dependently scheduled cleaning activity may also be canceled if a time difference between the two cleaning activities would fall short of a defined minimum time interval. The cleaning activities may also be combined with one another such that only a single cleaning activity takes place instead of two successive cleaning activities, particularly in the course of the implementation of the event-dependent activity scenario. A ranking for time conflicts may furthermore be established in such a way that the control unit checks which location should be cleaned in which time window. If a certain time interval does not suffice for cleaning the same environment section or multiple environment sections, the duration of a cleaning activity may be reduced such that a subsequent cleaning activity can take place as scheduled. The shortened cleaning activity can then be compensated by scheduling a time-dependent cleaning activity that satisfies a still existing cleaning requirement. If such a cleaning activity is already scheduled in a chronologically recurring manner, the time interval between the regular cleaning activities may also be shortened such that the cleaning activities altogether lead to an optimal cleaning result. If applicable, defined environment sections may also be reduced in size or additionally subdivided such that a portion of a defined environment section, which has the greatest need for cleaning, particularly is cleaned first.

An environment section, which is scheduled for multiple event-dependent activity scenarios and/or for an event-dependent activity scenario as well as a time-dependent cleaning activity, may furthermore be treated with priority. If multiple event-dependent activity scenarios overlap in such a way that multiple activity scenarios contain cleaning of the same environment section, it may be defined, particularly also as part of a predefined ranking, that an environment section, which is also subject to other defined events, is treated with priority during the implementation of an activity scenario, i.e. that this environment section is treated first. This makes it possible to prevent an implementation conflict in the certain environment section in case multiple events concerning the same environment section occur simultaneously. An environment section, which should be cleaned in case of the occurrence of a predefined event, as well as in dependence on a defined cleaning schedule, may likewise be treated with priority. This makes it possible to prevent a spontaneous weighting between the time-dependent schedule and the event-dependent schedule in advance when a predefined event occurs randomly.

It is furthermore proposed that the occurrence of a defined event is detected in a machine-assisted manner by means of a detection device of the cleaning device or by means of a detection device arranged externally of the cleaning device, wherein the event is selected from the following group: presence of persons and/or animals in at least one environment section, occurrence of a dirt accumulation in at least one environment section, start of an activity of a person that causes a dirt accumulation, occurrence of an environmental and/or weather event, occurrence of an air pollution and/or pollen count above a defined limiting value, occurrence of an acoustic signal in at least one environment section and activity of an electrical consumer and/or an electrical switching element in at least one environment section. According to this embodiment, the event is not manually reported to a control unit of the cleaning system by a user, but rather detected and reported by a detection device associated with the cleaning system. This detection device may be associated with a cleaning device or installed in the environment independently thereof, e.g., in the form of a stationary detection device that monitors a room or the like. Furthermore, the detection device may also be an external detection device that merely reports environment parameters to the cleaning system, wherein said environment parameters define an event, in dependence on which a cleaning scenario should be carried out. Such detection devices may consist, for example, of weather sensors, air pollution sensors, pollen count sensors or the like, wherein said detection devices do not form part of the household of the user, but rather are operated by weather stations or the like. The event detected by the detection device may be detected, for example, by means of a dirt measurement, a humidity measurement, a pollen count measurement or the like. Furthermore, defined events may also be a motion in an environment section, a data transmission via a wireless communication network such as a WLAN and/or Bluetooth connection or a signal of an electronic switch, e.g., a switch that is incorporated into a so-called smart-home system. Such a switch may indicate, for example, closing of a front door, opening of a window, the actuation of the light switch, the activation of a microphone, the activation of a monitoring camera or the like. Other defined events may be detected, for example, based on an airborne pollen radar, a rain radar or other data of a weather station. Certain detection devices or external information sources particularly may be allocated to defined activity scenarios. In this case, the detection device detecting the occurrence of a defined event is determined for each activity scenario. For example, a signal of a motion sensor can be used for a defined event "end of visit." This applies analogously to the event "domestic animal present." For example, an activity of one or more kitchen appliances can be detected for the event "cooking/baking." Weather information and/or pollen count information provided by external databases can be used for defined events such as "foul weather," "airborne pollen" or the like. The allocation of certain sensors or information sources to defined activity scenarios may likewise be stored in the above-described database. A user of the cleaning system can specify such an allocation when the activity scenarios are established.

It is furthermore proposed that information on a floor type to be cleaned and/or information on a cleaning device to be used is stored for each environment section in the environment map and/or in the database of the cleaning system. Consequently, the control unit may upon the occurrence of a defined event favor a certain cleaning device, which is particularly well suited for cleaning a certain floor type in the environment section in question, for the associated activity scenario, namely the implementation of a certain cleaning activity in a certain environment section. The allocation of the floor types to environment sections or of the cleaning devices to certain cleaning activities can be carried out by the user, for example, manually by means of an application installed on a user terminal. It would furthermore be possible, for example, to automatically detect floor types by means of one of the cleaning devices and to store these floor types in the database.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 shows the cleaning system with a plurality of cleaning devices;

FIG. 3 shows a database with a table containing activity scenarios for the defined environment sections and cleaning activities.

DETAILED DESCRIPTION OF PREFERRED EMBODIMENTS

Figure 2C:
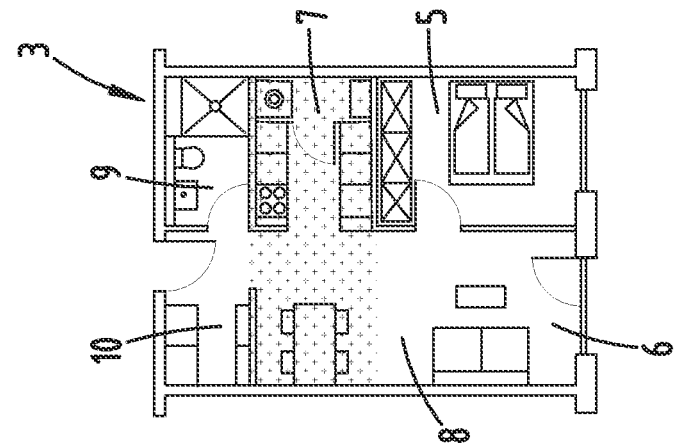
FIG. 2c shows a third event-dependent activity scenario.

FIG. 1 shows a cleaning system with two exemplary cleaning devices 1, 2, which are representative for other potential cleaning devices 1, 2 of the cleaning system. Alternatively, a cleaning system may also comprise only a single cleaning device 1, 2. In this example, the first cleaning device 1 is a self-traveling vacuuming robot. The second exemplary cleaning device 2 is a self-traveling wiping robot. The self-traveling cleaning devices 1, 2 have wheels 16 that are driven by a not-shown drive system. Each cleaning device 1, 2 has different cleaning elements 17 depending on the type of cleaning device 1, 2. In this case, the cleaning element of the cleaning device 1 is realized in the form of a rotating brush and the cleaning element of the cleaning device 2 is realized in the form of a wiping element that preferably oscillates. The cleaning elements 1, 2 respectively have a not-shown local memory, in which an environment map 3 of the environment is stored. The cleaning device 1, 2 can orient itself and self-localize based on the environment map 3 while it travels in the environment. The cleaning devices 1, 2 respectively have a not-shown rechargeable accumulator for the power supply of the individual electrical consumers of the cleaning devices 1, 2, e.g., for the drive system.

Furthermore, the cleaning devices 1, 2 are respectively equipped with a navigation device 18. The navigation device 18 is provided with a sensor system, particularly a distance measuring device, which can measure distances from objects in the environment. In this example, the sensor system has a laser diode, wherein the light beam emitted by said laser diode extends out of a housing of the cleaning device 1, 2 and can be rotated about an axis of rotation that extends vertically in the illustrated orientation of the cleaning device 1, 2. This particularly allows an all-around distance measurement about the cleaning device 1, 2. The environment can be surveyed in a preferably horizontal plane, i.e. in a plane extending parallel to the surface to be treated, with the aid of the sensor system. In this way, collisions with obstacles can be prevented while the cleaning device 1, 2 travels in the environment. The environment data recorded by means of the sensor system is used for generating the exemplary environment map 3 shown. For example, the cleaning device 1, 2 may furthermore have a not-shown odometry sensor, which measures a distance traveled by the cleaning device 1, 2, for navigation and self-localization purposes. The cleaning device 1, 2 may, for example, also have one or more contact sensors or the like.

In this case, the cleaning devices 1, 2 are communicatively linked to a central control unit 15, which in this example is located in a so-called cloud, via a wireless communication link, preferably WLAN. A database 4 containing a table, which is described in greater detail below with reference to FIGS. 2a, 2b, 2c and 3, is assigned to the control unit 15. Another subscriber of the wireless communication network is a terminal 19 of the user, which in this example is a mobile telephone with an application installed thereon. The user can inform the cleaning system of events 11 by means of the terminal 19. The event 11 "imminent visit" triggers the implementation of a predefined activity scenario 12 that contains multiple cleaning activities 13 in certain environment sections 5 to 10. This is described in greater detail below with reference to FIGS. 2a, 2b, 2c and 3. The cleaning devices 1, 2 furthermore have detection devices 14 that are suitable for detecting events 11 based on environment parameters.

The control unit 15 of the cleaning system has access to the environment map 3 that was generated by the cleaning devices 1, 2 and represents a floor plan of a residence with environment sections 5 to 10, as well as to a database 4 that is realized in the form of a table in this example and contains activity scenarios 12 comprising defined combinations of environment sections 5 to 10 and cleaning activities 13 to be carried out therein.

Figure 2B:
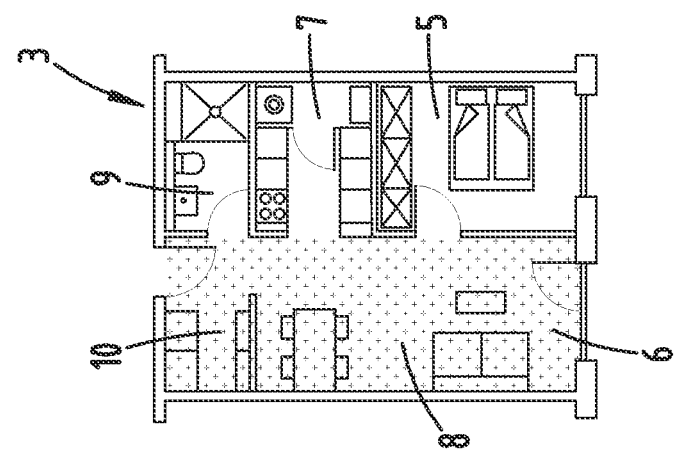
FIG. 2b shows a second event-dependent activity scenario.
Figure 2A:
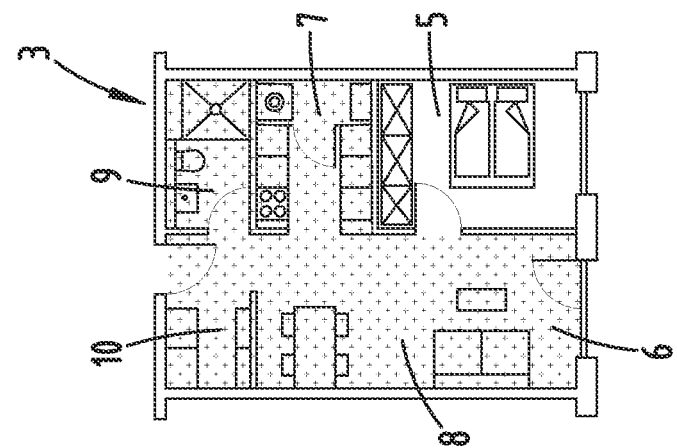
FIG. 2a shows a first event-dependent activity scenario.

FIGS. 2a to 2c graphically show three different activity scenarios based on an environment map 3. The environment map 3 shown contains a total of six environment sections 5 to 10, wherein a first environment section 5 represents a bedroom, another environment section 6 represents a living room, an environment section 7 represents a kitchen, an environment section 8 represents a dining room, an environment section 9 represents a bathroom and an environment section 10 represents an entry area with a wardrobe. Defined environment sections 5 to 10 are illustrated in a shaded manner in the environment maps 3 according to FIGS. 2a, 2b and 2c. These environment sections 5 to 10 indicate the environment sections 5 to 10 to be treated during the exemplary activity scenarios 12 illustrated in the figures.

FIG. 2a elucidates an activity scenario 12 "visit," which should be carried out before a visitor enters the residence shown. If the event "visit" occurs, relevant environment sections 5 to 10 of the environment, which a guest usually enters, should be cleaned in advance. In the example shown, this includes the environment sections 6 (living room), 7 (kitchen), 8 (dining room), 9 (bathroom) and 10 (entry area/wardrobe).

The table according to FIG. 3, which is stored in the database, 4, contains the environment sections 5 to 10 in its columns and the events 11 in its rows. Furthermore, a type of cleaning activity 13 to be carried out, in this example dry cleaning, wet cleaning or dry cleaning as well as wet cleaning, is indicated in the intersecting area between the columns and the rows. In this case, the events 11 include a visit, the end of a visit, the presence of a domestic animal, the presence of children, a cooking activity and airborne pollen, as well as events that basically involve a cleaning activity 13 in all environment sections 5 to 10 and a variation, in which only the entry area and the living room are scheduled for spot cleaning.

According to a potential embodiment, the invention functions in such a way that the user of the cleaning system initially defines the events 11 illustrated in FIG. 3, which should trigger an activity scenario 12. For this purpose, the user accesses the database 4 and establishes the table shown, wherein an exemplary user entry into one of the rows specifies that the environment sections 6, 7, 8, 9, 10 should be cleaned in case of the event 11 "visit." However, the environment section 5 (bedroom) should not be cleaned because guests usually do not enter this environment section. In addition to the environment sections 6, 7, 8, 9, 10, the user also specifies which cleaning activities 13 should be carried out in these environment sections 6, 7, 8, 9, 10. In this case, this concerns dry cleaning as well as wet cleaning. In addition, the user can also store the cleaning devices 1, 2 to be used for a cleaning activity 13 in the table, but this option is not illustrated in the figures. In this context, the user could define that dry cleaning should be carried out by the cleaning device 1 and that wet cleaning should be carried out by the cleaning device 2. If the user has not stored this allocation of cleaning devices 1, 2 in the database 4 beforehand, for example, an automatic allocation of cleaning activities 13 to the cleaning devices 1, 2 can subsequently be carried out by the control unit 15 of the cleaning system when the event 11 occurs. The user can establish such an allocation between environment sections 5 to 10 and cleaning activities 13 for a plurality of self-defined events 11. The exemplary table illustrated in FIG. 3 is available after the user has defined the activities scenarios 12 with associated environment sections 5 to 10, cleaning activities 13 and, if applicable, cleaning devices 1, 2. The table is therefore stored in the database 4 and can be read out by the control unit 15.

Once the user is informed of an imminent visit as illustrated in FIG. 1, e.g., during a telephone conversation, the user announces the event 11 "imminent visit" by inputting a corresponding text in the application installed on his terminal 19 or by pressing a designated functional panel that is linked to the associated activity scenario 12 "visit." The terminal 19 transmits the event 11 to the control unit 15 of the cleaning system by means of wireless communication, wherein the control unit subsequently accesses the database 4 and selects the activity scenario defined for the event 11 "visit" from the activity scenarios 12 stored in the database. If the database 4 does not yet contain any information on which cleaning device 1, 2 should carry out which cleaning activity 13 of the activity scenario 12 defined for the event 11, the control unit 15 determines ad hoc which cleaning device 1, 2 is suitable and available for the cleaning activities 13 contained in the activity scenario 12. For this purpose, the database 4 may likewise contain information on which cleaning devices 1, 2 of the cleaning system are currently available, which cleaning parameters these cleaning devices can carry out, e.g. if the respective cleaning device 1, 2 is a vacuuming device or a wiping device, which cleaning elements 17 are available to the cleaning device 1, 2, the charge status of the accumulator of the respective cleaning device 1, 2, the maximum treatment speed of the cleaning device 1, 2 and similar parameters. The control unit 15 then controls the sequence of cleaning activities 13 defined in the activity scenario 12 "visit," wherein a cleaning activity 13 of the first cleaning device 1, as well as a cleaning activity 13 of the second cleaning device 2, can be carried out successively or in this case preferably also simultaneously, but the first cleaning device 1 in the form of a vacuuming robot initially requires a head start referred to the cleaning activity 13 of the second cleaning device 2 in the form of a wiping device. The control unit 15 basically can define a sensible sequence of the cleaning activities 13 of the cleaning devices 1, 2, i.e. a sequence that particularly saves time and resources, based on the available information on the environment sections 5 to 10 to be cleaned, the cleaning activities 13 to be carried out therein and the available cleaning devices 1, 2. In this case, the control unit 15 may act in accordance with a policy that is predefined by the system or by the user and assigns a defined ranking to the environment sections 5 to 10 within the activity scenario 12. An environment section 5 to 10, which not only should be cleaned in the course of the event-defined activity scenario 12, but rather also regularly or irregularly in accordance with a predefined schedule, may be assigned the highest rank (and therefore be cleaned first). For example, such a schedule may concern a personal appointment calendar of the user, in which appointed times for cleaning a certain environment section 5 to 10 are stored. The user can specify, for example, that the kitchen (environment section 7) should be vacuumed and wiped every day at 7 p.m. by means of his terminal 19 and the application installed thereon. During the determination of a sequence for the cleaning activities 13 of the event-dependent activity scenario 12, the control unit 15 therefore can check which of the environment sections 5 to 10 is also a location for carrying out a time-dependently scheduled cleaning activity 13. For example, the control unit 15 can determine that the environment section 7 (kitchen) is cleaned regularly every day at 7 p.m. and should also be treated in the course of the now scheduled activity scenario 12. The control unit 15 subsequently decides that the "doubly scheduled" environment section 7 should be cleaned preferentially, i.e. prior to the remaining environment sections 6, 8, 9, 10. Furthermore, a highest rank may alternatively also be assigned to an environment section 5 to 10 that is defined for multiple event-dependent activity scenarios 12, e.g. an environment section that should be cleaned in case of the event 11 "visit" and also in case of the event 11 "cooking" or the like. In this case, the policy may specify, for example, that the environment section 7 should be cleaned prior to the other environment sections 6, 8, 9, 10. Rankings may also be stored in the database 4 for instances, in which multiple events 11, for which an activity scenario 12 is stored, occur simultaneously or are active simultaneously. In this way, it is decided which of the activity scenarios 12 to be carried out should be carried out with priority. It would be possible, for example, that the event 11 "visit" occurs on the one hand and the event 11 "airborne pollen" occurs on the other hand. The policy may contain the rule that activity scenarios 12 involving persons should always be carried out. In the present example, this is the activity scenario 12 "visit" such that this activity scenario is carried out prior to the activity scenario 12 "airborne pollen." It would alternatively also be possible to define that both activity scenarios 12 are carried out simultaneously or that the cleaning activities 13 contained therein are combined into a single cleaning activity 13 if they exist twice.

According to an alternative embodiment of the invention, the cleaning system may not be informed of the event 11 manually by the user, but the event rather is detected by means of a detection device 14 of the cleaning system, e.g., by means of the detection device 14 of one of the cleaning devices 1, 2. For example, the cleaning device 1, 2 may detect an event 11 in the form of the presence of persons and/or animals in one or more environment sections 5 to 10, the occurrence of a dirt accumulation in an environment section 5 to 10, the activity of a kitchen appliance in the environment section 7 (kitchen) and the like. The cleaning device 1, 2 subsequently transmits the information on the detected event 11 to the control unit 15 of the cleaning system. If applicable, the cleaning device 1, 2 may furthermore transmit a self-generated environment map 3, additional information, for example, on a floor type detected in the respective environment section 5 to 10 or other information. The control unit 15 of the cleaning system subsequently controls the implementation of the activity scenarios 12 defined for the event 11 as described above with reference to the first exemplary embodiment. The event 11 "domestic animal" occurs, for example, when the presence of a domestic animal was detected, wherein the control unit 15 determines the activity scenario 12 defined for this event 11 and controls the cleaning activities 13 to be carried out in the course of this activity scenario 12.

Although only a few embodiments of the present invention have been shown and described, it is to be understood that many changes and modifications may be made thereunto without departing from the spirit and scope of the invention.

LIST OF REFERENCE SYMBOLS

1 Cleaning device
2 Cleaning device
3 Environment map
4 Database
5 Environment section
6 Environment section
7 Environment section
8 Environment section
9 Environment section
10 Environment section
11 Event
12 Activity scenario
13 Cleaning activity
14 Detection device
15 Control unit
16 Wheel
17 Cleaning element
18 Navigation device
19 Terminal

What is claimed is:

1. A method for operating a cleaning system that comprises at least one self-traveling cleaning device, comprising:

traveling with the at least one cleaning device in an environment based on an environment map; and carrying out cleaning activities said environment with the at least one cleaning device, the step of carrying out including accessing a database, in which multiple cleaning activities to be carried out in at least one environment section of the environment are stored, wherein a user accesses the database and defines in advance at least one randomly occurring event, which changes a cleaning status of at least one environment section and depending on the occurrence of said at least one randomly occurring event at least one certain cleaning activity is determined to be carried out in at least one certain environment section, wherein the user defines an event-dependent activity scenario for the defined event in advance, before the occurrence of the event, wherein said activity scenario contains a defined allocation of a certain cleaning activity to be carried out to a certain environment section, in which the cleaning activity should be carried out, and wherein the activity scenario is carried out by the at least one cleaning device upon the subsequent occurrence of the defined event, wherein at least one additional cleaning activity is also scheduled time-dependently in addition to the defined event-dependent activity scenario, wherein it is decided in accordance with predefined rules whether only the event-dependent activity scenario or only the time-dependently scheduled cleaning activity is carried out in case a time of an occurrence of a defined event falls short of a predefined minimum time interval from a defined time for carrying out the time-dependently scheduled cleaning activity for the same environment section.

2. The method according to claim 1, wherein the activity scenario contains information on the at least one cleaning device, by means of which the cleaning activity is determined to be carried out.

3. The method according to claim 1, wherein the user informs the cleaning system of the occurrence of a defined event manually or the occurrence of the defined event is detected by means of a detection device in order to inform the system automatically, wherein a control unit of the system retrieves a defined activity scenario for the event, of which the control unit has been informed, from the database and controls the implementation of the at least one cleaning activity contained in said activity scenario.

4. The method according to claim 1, wherein multiple event-dependent activity scenarios are weighted relative to one another with a defined ranking, wherein the activity scenario with the highest rank is carried out first in case multiple defined events occur simultaneously, and wherein the highest rank is assigned to an activity scenario that is defined for an event involving a person and/or an animal.

5. The method according to claim 1, wherein multiple environment sections, which should be cleaned in the course of the same event-dependent activity scenario, are weighted relative to one another with a defined ranking, wherein the environment section with the highest rank is cleaned first, wherein the highest rank is assigned to the environment section, which in addition to the event-dependent activity scenario is also a location for carrying out a time-dependently scheduled cleaning activity, and wherein the highest rank is assigned to an environment section that is scheduled for a time-dependent cleaning activity at an earlier time.

6. The method according to claim 1, wherein an environment section, which is scheduled for multiple event-dependent activity scenarios and/or for an event-dependent activity scenario as well as a time-dependent cleaning activity, is given priority over other environment sections.

7. The method according to claim 1, wherein the occurrence of a defined event is detected by means of a detection device of the cleaning device or by means of a detection device arranged externally of the cleaning device, wherein the event is selected from the following group: presence of persons and/or animals in at least one environment section, occurrence of a dirt accumulation in at least one environment section, start of an activity of a person that causes a dirt accumulation, occurrence of an environmental and/or weather event, occurrence of an air pollution and/or pollen count above a defined limiting value, occurrence of an acoustic signal in at least one environment section and activity of an electrical consumer and/or an electrical switching element in at least one environment section.

8. The method according to claim 1, wherein information on a floor type to be cleaned in the environment section and/or information on a cleaning device to be used is stored for each environment section in the environment map and/or in the database.

9. The method according to claim 1, wherein one or more additional parameters is or are taken into account in the decision as to which cleaning activity is carried out in the each environment section, wherein said parameter or parameters is or are selected from the following group: a time and/or type of a cleaning activity carried out most recently in the respective environment section, a number of persons and/or animals present in the environment, a usual dirt quantity occurring in the environment section and cleaning of the environment section by means of a manually operated cleaning device.

* * * * *